United States Patent
Mitchell et al.

(10) Patent No.: US 9,808,889 B2
(45) Date of Patent: Nov. 7, 2017

(54) GAS TURBINE INCLUDING SEALING BAND AND ANTI-ROTATION DEVICE

(71) Applicant: Siemens Energy, Inc., Orlando, FL (US)

(72) Inventors: David J. Mitchell, Oviedo, FL (US); Michael J. Olejarski, Merritt Island, FL (US); Christopher J. Muller, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 926 days.

(21) Appl. No.: 14/155,585

(22) Filed: Jan. 15, 2014

(65) Prior Publication Data

US 2015/0198055 A1    Jul. 16, 2015

(51) Int. Cl.
| | |
|---|---|
| *F01D 5/06* | (2006.01) |
| *F01D 11/00* | (2006.01) |
| *B23K 31/02* | (2006.01) |
| *B23K 33/00* | (2006.01) |
| *B23K 101/00* | (2006.01) |

(52) U.S. Cl.
CPC ............ *B23K 31/02* (2013.01); *B23K 33/004* (2013.01); *F01D 11/005* (2013.01); *B23K 2201/001* (2013.01); *F05D 2230/232* (2013.01); *F05D 2250/75* (2013.01)

(58) Field of Classification Search
CPC ........... F01D 5/06; F01D 11/005; F01D 5/066
USPC ................. 415/173.7, 19.5, 230, 231, 199.5; 416/198 A, 198 R, 220 R
See application file for complete search history.

(56) References Cited

U.S. PATENT DOCUMENTS

| | | |
|---|---|---|
| 5,320,488 A | 6/1994 | Meade et al. |
| 5,709,530 A * | 1/1998 | Cahill ................... F01D 11/005 277/644 |
| 5,865,600 A | 2/1999 | Mori et al. |
| 5,967,746 A | 10/1999 | Hagi et al. |
| 6,089,827 A | 7/2000 | Ichiryu et al. |
| 6,315,301 B1 | 11/2001 | Umemura et al. |

(Continued)

OTHER PUBLICATIONS

Manish S. Gurao; Application entitled "Gas Turbine Incluidng Belly Band Seal Anti-Rotation Device"; U.S. Appl. No. 13/665,992, filed Nov. 1, 2012; United States Patent and Trademark Office.

(Continued)

*Primary Examiner* — Sean J Younger (57) ABSTRACT

A turbine is provided comprising a plurality of stages, each stage comprising a rotatable disk and blades carried thereby, at least one pair of adjacent rotatable disks defining an annular gap therebetween and having respective opposing sealing band receiving slots aligned with the annular gap A sealing band is located in the opposing receiving slots to seal the annular gap Disk engagement structure is defined in the pair of adjacent rotatable disks. A clip member is coupled to the sealing band and engaged with the pair of adjacent rotatable disks through the disk engagement structure The clip member may have an aperture extending only partially through the clip member for alignment with a hole in the sealing band for engagement with a tool To improve weld geometry, the clip member may have angled surfaces and notched areas, and the sealing band may have chamfered edges.

17 Claims, 5 Drawing Sheets

(56) References Cited

U.S. PATENT DOCUMENTS

| | | | |
|---|---|---|---|
| 6,926,284 B2* | 8/2005 | Hirst | F01D 11/005 |
| | | | 277/603 |
| 7,470,113 B2 | 12/2008 | Tran et al. | |
| 7,549,845 B2 | 6/2009 | Uwami et al. | |
| 7,581,931 B2 | 9/2009 | Shaefer et al. | |
| 8,162,598 B2* | 4/2012 | Liang | F01D 11/001 |
| | | | 415/115 |
| 8,376,697 B2* | 2/2013 | Wiebe | F01D 11/001 |
| | | | 415/173.7 |
| 8,388,309 B2* | 3/2013 | Marra | F01D 5/025 |
| | | | 415/171.1 |
| 9,200,519 B2* | 12/2015 | Nereim | F01D 5/06 |
| 9,334,738 B2* | 5/2016 | Nereim | F01D 5/06 |
| 9,347,322 B2* | 5/2016 | Gurao | F01D 5/06 |
| 9,399,926 B2* | 7/2016 | Wiebe | F01D 11/08 |
| 2005/0265846 A1 | 12/2005 | Przytulski et al. | |
| 2009/0191050 A1 | 7/2009 | Nereim et al. | |
| 2010/0074731 A1 | 3/2010 | Wiebe et al. | |

OTHER PUBLICATIONS

Christopher J. Muller; Application entitled Gas Turbine Incluidng Bellyband Seal Anti-Rotation Device; U.S. Appl. No. 13/789,802, filed Mar. 8, 2013; United States Patent and Trademark Office.

\* cited by examiner

GAS TURBINE INCLUDING SEALING BAND AND ANTI-ROTATION DEVICE

FIELD OF THE INVENTION

This invention relates in general to seals for multistage turbomachines and, more particularly, to an anti-rotation structure for a seal provided between adjoining disks in a multistage turbomachine.

BACKGROUND OF THE INVENTION

In various multistage turbomachines used for energy conversion, such as turbines, a fluid is used to produce rotational motion. In a gas turbine, for example, a gas is compressed through successive stages in a compressor and mixed with fuel in a combustor. The combination of gas and fuel is then ignited for generating combustion gases that are directed to turbine stages to produce the rotational motion. The turbine stages and compressor stages typically have stationary or non-rotary components, e.g., vane structures that cooperate with rotatable components, e.g., rotor blades, for compressing and expanding the operational gases.

The rotor blades are typically mounted to disks that are supported for rotation on a rotor shaft. Annular arms extend from opposed portions of adjoining disks to define paired annular arms. A cooling air cavity is formed on an inner side of the paired annular arms between the disks of mutually adjacent stages, and a labyrinth seal may be provided on the inner circumferential surface of stationary vane structures for cooperating with the annular arms to effect a gas seal between a path for the hot combustion gases and the cooling air cavity. The paired annular arms extending from opposed portions of adjoining disks define opposing end faces located in spaced relation to each other. Typically the opposing end faces may be provided with a slot for receiving a sealing band, known as a "bellyband seal," which bridges the gap between the end faces to prevent cooling air flowing through the cooling air cavity from leaking into the path for the hot combustion gases. The sealing band may be formed of multiple segments, in the circumferential direction, that are interconnected at lapped or stepped ends.

When the sealing band comprises plural segments positioned adjacent to each other, in the circumferential direction, the sealing bands may shift circumferentially relative to each other. Shifting may cause one end of a sealing band segment to increase the overlap with an adjacent segment, while the opposite end of the sealing band segment will move out of engagement with an adjacent segment, opening a gap for passage of gases through the sealing band.

SUMMARY OF THE INVENTION

According to an aspect of the invention, a turbine is provided comprising a plurality of stages, each stage comprising a rotatable disk and blades carried thereby. At least one pair of adjacent rotatable disks define an annular gap therebetween and have respective opposing sealing band receiving slots aligned with the gap. A sealing band is located in the opposing sealing band receiving slots to seal the annular gap. Disk engagement structure is defined in the pair of adjacent rotatable disks. A clip member is coupled to the sealing band and in engagement with the pair of adjacent rotatable disks through the disk engagement structure. The clip member may have an aperture extending only part way through the clip member and used during assembly of the clip member to the sealing band. The clip member restricts movement of the sealing band.

Band engagement structure may be provided comprising a pair of circumferentially aligned band notches in opposing edges of the sealing band.

The clip member may comprise a U-shaped clip member having first and second legs and a center portion, the aperture being provided in the center portion.

The turbine may further comprise an attachment structure affixing the legs of the U-shaped member to the sealing band. The attachment structure may comprise welded joints between the clip member legs and the band.

The sealing band may include a hole located between axially spaced-apart first and second edges of the sealing band. The hole in the sealing band may be generally aligned with the aperture in the clip member to allow a tool to pass through the sealing band hole and threadedly engage with the clip member aperture to retain the clip member in engagement with the sealing band during formation of the welded joints between the U-shaped clip member legs and the sealing band.

Prior to the formation of the welded joints, a first edge of the sealing band may comprise a first chamfer, and a second edge of the sealing band may comprise a second chamfer. A first angle greater than about 50 degrees may be defined by the first chamfer and an angled first surface of the first leg of the U-shaped clip member. A second angle greater than about 50 degrees may be defined by the second chamfer and an angled second surface of the second leg of the U-shaped clip member.

The first chamfer may be defined in the band engagement structure first notch and the second chamfer may be defined in the band engagement structure second notch.

Prior to the formation of the welded joints, a first notched relief area may be defined at an intersection of the first surface of the first leg of the clip member and an engagement surface of the base portion of the clip member. A second notched relief area may be defined at an intersection of the second surface of the second leg of the clip member and the engagement surface of the main portion of the clip member.

According to another aspect of the invention, a turbine is provided comprising: a plurality of stages, each stage comprising a rotatable disk and blades carried thereby. At least one pair of adjacent rotatable disks defines an annular gap therebetween and has respective opposing sealing band receiving slots aligned with the gap. A sealing band is located in the opposing sealing band receiving slots to seal the annular gap. The sealing band comprises axially spaced-apart first and second edges. A disk engagement structure is defined in the pair of adjacent rotatable disks. A clip member is coupled to the sealing band and engaged with the pair of adjacent rotatable disks through the disk engagement structure. The clip member may comprise a U-shaped clip member having first and second legs and a center portion. The clip member restricts movement of the sealing band. Welded joints affix the legs of the clip member to the sealing band.

Prior to the welded joints being formed, the first edge of the sealing band comprises a first chamfer, and a first angle greater than about 50 degrees may be defined by the first chamfer and an angled first surface of the first leg of the clip member. Prior to the welded joints being formed, the second edge of the sealing band may comprise a second chamfer, and a second angle greater than about 50 degrees may be defined by the second chamfer and an angled second surface of the second leg of the U-shaped clip member.

The first edge of the sealing band may further comprise a third chamfer, and the second edge of the sealing band may further comprise a fourth chamfer. The first and third chamfers define a first V-edge, and the second and fourth chamfers define a second V-edge. Each of the first and second V-edges may define an angle within a range of from about 85 to about 95 degrees. Each of the angled surfaces of the legs of the U-shaped clip member may define an angle between a line constructed perpendicular to a clip member engagement surface and the angled leg surface within a range of from about 10 to 20 degrees. Such angled surfaces of the legs of the U-shaped clip member in conjunction with the first and second chamfers on the sealing band form V-groove welding preparation areas, each of an included angle falling within the range of from about 50 to 70 degrees.

Prior to the welded joints being formed, a first notched relief area may be defined at an intersection of the first surface of the first leg of the U-shaped clip member leg and an engagement surface of the center portion of the U-shaped clip member, and a second notched relief area may be defined at an intersection of the second surface of the second leg of the U-shaped clip member and the engagement surface of the center portion of the U-shaped clip member. Such relieved areas reduce stiffness of the clip member legs, thereby accommodate weld shrinkage during solidification and reduce the propensity for weld cracking. Such relieved areas in conjunction with the third and fourth chamfers provide for full weld penetration, full weld strength, elimination of root notch stress concentrators, and (again) reduced propensity for weld cracking.

According to another aspect of the invention, a process is provided for coupling a clip member to a sealing band, the sealing band being located in opposing sealing band receiving slots of a pair of adjacent rotatable disks of a turbine. The U-shaped clip member may have first and second legs and a center portion with an aperture extending only part way through the center portion of the clip member. The sealing band may comprise a hole located between axially spaced-apart first and second edges of the sealing band. The process comprises: aligning the aperture in the clip U-shaped member center portion with the hole in the sealing band; passing a tool through the sealing band hole; threadedly engaging the tool with the clip member aperture so as to retain the clip member in engagement with the sealing band; and forming welded joints between the U-shaped clip member legs and the sealing band.

Prior to forming the welded joints, the first edge of the sealing band may comprise a first chamfer, and the second edge of the sealing band may comprise a second chamfer. A first angle greater than about 50 degrees may be defined by the first chamfer and an angled first surface of the first leg of the U-shaped clip member, and a second angle greater than about 50 degrees may be defined by the second chamfer and an angled second surface of the second leg of the U-shaped clip member.

Prior to forming the welded joints, a first notched relief area may be defined at an intersection of the first surface of the first leg of the U-shaped clip member and an engagement surface of the center portion of the U-shaped clip member, and a second notched relief area may be defined at an intersection of the first surface of the second leg of the U-shaped clip member and the engagement surface of the center portion of the U-shaped clip member.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
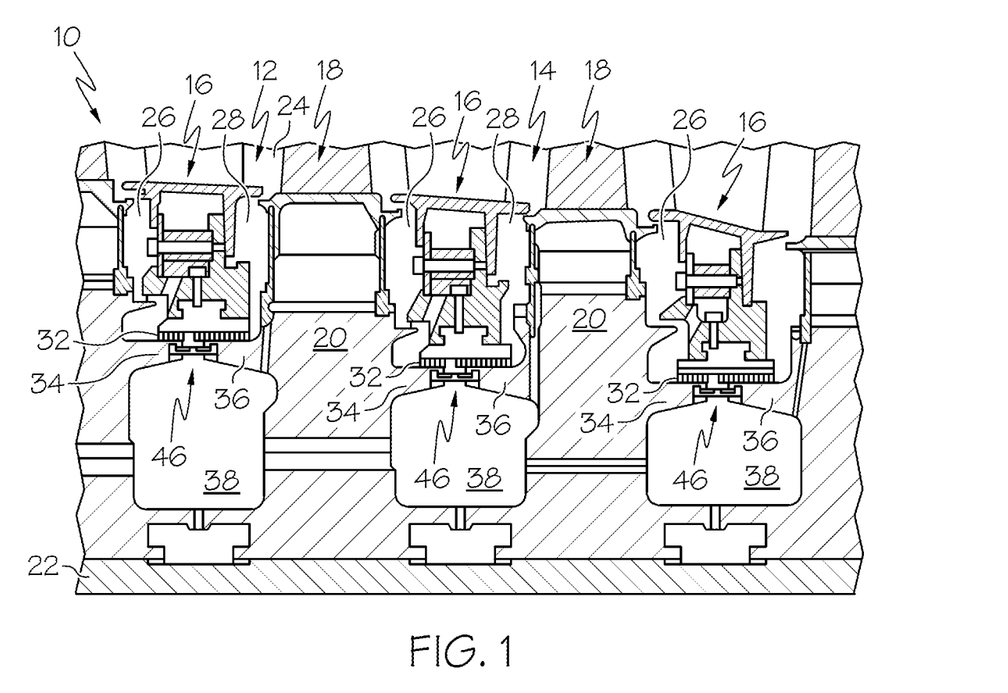
FIG. 1 is a diagrammatic sectional view of a portion of a gas turbine engine.

Referring to FIG. 1, a portion of a turbine engine 10 is illustrated diagrammatically including adjoining stages 12, 14, each stage 12, 14 comprising an array of stationary vane assemblies 16 and an array of rotating blades 18, where the vane assemblies 16 and blades 18 are positioned circumferentially within the engine 10 with alternating arrays of vane assemblies 16 and blades 18 located in the axial direction of the turbine engine 10. The blades 18 are supported on rotor disks 20 secured to adjacent disks with spindle bolts 22. The vane assemblies 16 and blades 18 extend into an annular gas passage 24, and hot gases directed through the gas passage 24 flow past the vane assemblies 16 and blades 18 to remaining rotating elements.

Disk cavities 26, 28 are located radially inwardly from the gas passage 24. Purge air is preferably provided from cooling gas passing through internal passages in the vane assemblies 16 to the disk cavities 26, 28 to cool blades 18 and to provide a pressure to balance against the pressure of the hot gases in the gas passage 24. In addition, interstage seals comprising labyrinth seals 32 are supported at the radially inner side of the vane assemblies 16 and are engaged with surfaces defined on paired annular disk arms 34, 36 extending axially from opposed portions of adjoining disks 20. An annular cooling air cavity 38 is formed between the opposed portions of adjoining disks 20 on a radially inner side of the paired annular disk arms 34, 36. The annular cooling air cavity 38 receives cooling air passing through disk passages to cool the disks 20.

Figure 2:
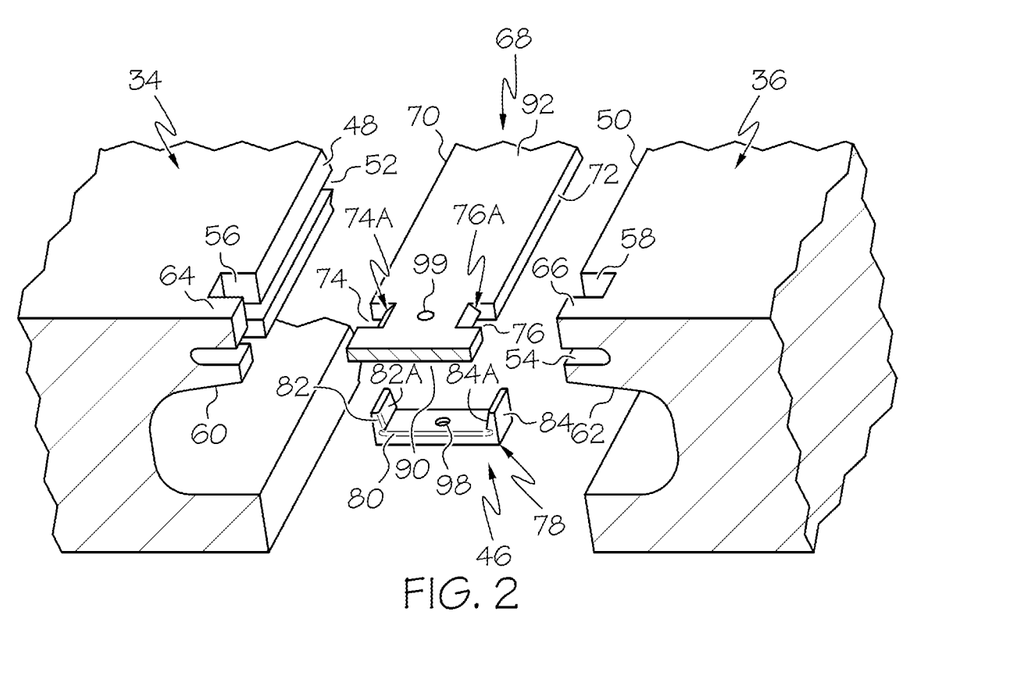
FIG. 2 is an exploded perspective view illustrating an anti-rotation structure having a clip member constructed in accordance with a first embodiment of the present invention and also illustrating a sealing band and adjacent rotatable disk arms.
Figure 3:
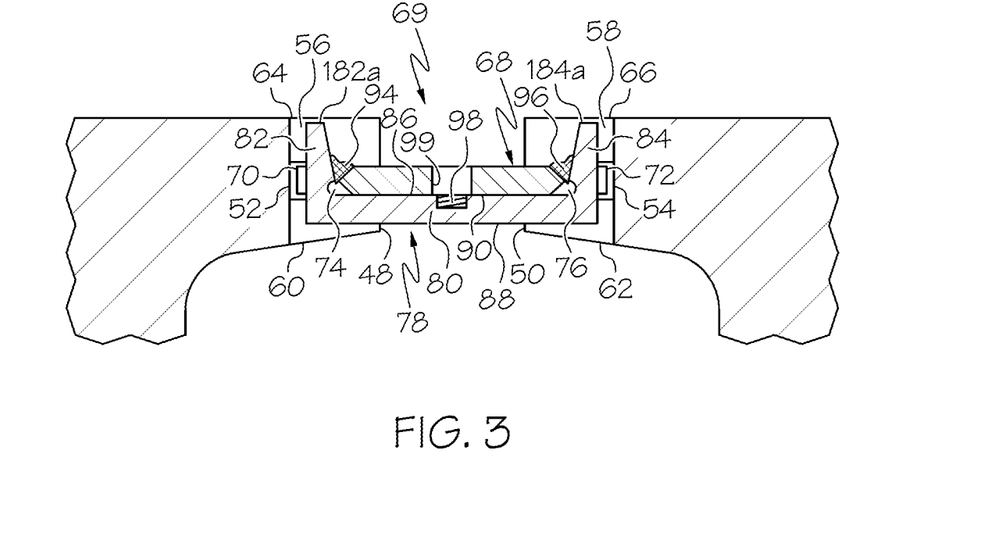
FIG. 3 is a cross-sectional view of the anti-rotation structure coupled to the sealing band.

Referring further to FIGS. 2 and 3, the disk arms of two adjoining disks 20 are illustrated for the purpose of describing the sealing band assembly 46 of the present invention, it being understood that the disks 20 and associated disk arms 34, 36 define an annular structure extending the full circumference about the rotor centerline. The disk arms 34, 36 define respective opposed end faces 48, 50 located in closely spaced relation to each other. A circumferentially extending slot 52, 54 is formed in the respective end faces 48, 50, wherein the slots 52, 54 are radially aligned with an annular gap 69 (FIG. 3) defined between the end faces 48, 50. In addition, the disk arms 34, 36 have a disk engagement structure comprising respective one or more pairs of disk notches or radial openings 56, 58 extending from a radially inner surface 60, 62 toward a radially outer surface 64, 66 of respective disk arms 34, 36, and extending axially inwardly from the end faces 48, 50 and intersecting the slots 52, 54.

Referring to FIG. 2, the sealing band assembly 46 includes a sealing band 68 forming a circumferentially extending bellyband seal. The sealing band 68 may comprise a plurality of segments, which are positioned adjacent to one another in the circumferential direction such that adjacent end edges of the segments in the circumferential direction overlap one another. The sealing band segments are not typically secured to one another.

The sealing band 68 includes opposing spaced-apart first and second sealing band edges 70, 72 which are positioned within the respective sealing band receiving slots 52, 54 (FIG. 3) defined in the opposed end faces 48, 50. The sealing band 68 spans the annular gap 69 between the end faces 48, 50 and defines a seal for preventing or substantially limiting flow of gases between the cooling air cavity 38 and the disk cavities 26, 28. The sealing band 68 additionally includes one or more band engagement structures, each comprising a pair of first and second band notches 74, 76 formed in the opposing sealing band edges 70, 72 for alignment with a corresponding pair of the radial openings 56, 58 formed in the disk arms 34, 36. A band engagement structure is preferably provided for each of the sealing band segments so as to prevent each sealing band segment from moving or shifting circumferentially relative to another sealing band segment. A pair of radial openings 56, 58 in the disk arms 34, 36 is provided for each band engagement structure.

Figure 6:
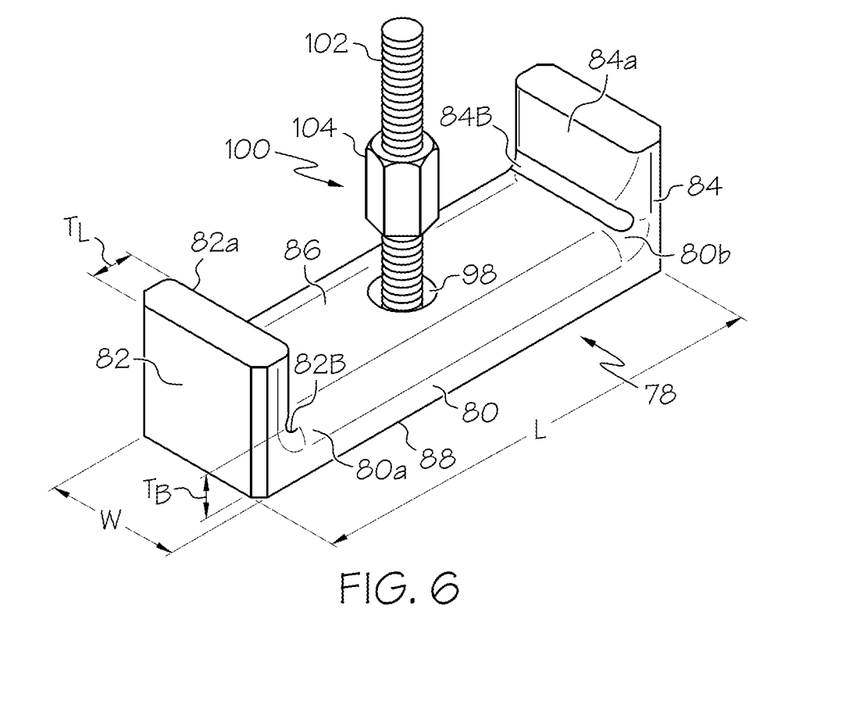
FIG. 6 is a perspective view of the clip member of FIG. 2 and the mounting structure.

Referring to FIGS. 2 and 6, in accordance with an aspect of the invention, the sealing band assembly 46 further includes a U-shaped anti-rotation body or clip member 78. Preferably, a clip member 78 is provided for each of the sealing band segments so as to prevent each sealing band segment from moving or shifting circumferentially relative to another sealing band segment. Each clip member 78 includes a center portion 80 having opposing ends 80*a*, 80*b* and first and second legs 82, 84 formed integral with the respective center portion ends 80*a*, 80*b*. The center portion 80 is a rectangular planar member having an outer side defining an engagement surface 86 and an inner side 88, and the legs 82, 84 extend outward from the outer side engagement surface 86 generally perpendicular to the center portion 80.

As seen in FIG. 3, each clip member 78 is assembled and coupled to an inner side 90 of the sealing band 68 with the legs 82, 84 positioned through a corresponding pair of band notches 74, 76. In particular, the center portion 80 is positioned with its engagement surface 86 engaged against the inner side 90 of the sealing band 68, and with outer ends 182*a*, 184*a* of the legs 82, 84 extending radially outwardly from an outer side 92 of the sealing band 68. When assembled, a hole 99 of the sealing band 68 is generally aligned with a threaded aperture 98 in the clip member 78. The threaded aperture 98 only extends part way through the clip member 78. Because the threaded bore 98 extends only part way through the clip member 78, flow of gases between the cooling air cavity 38 and the disk cavities 26, 28 through the clip member 78 and an adjacent portion of the sealing band 68 is prevented. As explained further below, the clip member 78 is held in position on the sealing band 68 by means of an attachment structure in the form of first and second weld joints 94, 96 between the legs 82, 84 and the sealing band 68.

In accordance with an aspect of the invention, it has been noted that some prior anti-rotation assemblies incorporating an anti-rotation body welded to a sealing band formed stresses at the weld joints resulting in cracking and possible failure at the weld joints. It is believed that the mass of the anti-rotation body, with an associated substantial centripetal load applied to the anti-rotation body during operation of the engine, is one factor that has contributed to failure of weld joints in anti-rotation assemblies. Further, some prior welded anti-rotation bodies included an engagement between the anti-rotation body and inwardly facing surfaces of the rotor disk arms, such engagement providing a restriction on radial movement of the anti-rotation body with a resulting restriction on radial movement of the sealing band, which is believed to have further contributed to stresses at the weld joints. Consequently, an aspect of the present invention includes forming the clip member 78 with a low mass that is also free to move within the disk notches 56, 58.

The low mass and unrestrained radial movement of the present sealing band assembly 46 is embodied by the clip member 78 being formed to effectively cooperate within the disk notches 56, 58 to limit circumferential movement of the sealing band 68, while also having preferred dimensions to only limit movement in the circumferential direction with a minimum of mass in the clip member 78 to minimize centripetal loading association with the clip member 78.

As may be seen in FIG. 3, the ends of the center portion 80 of the clip member 78 that extend axially past the disk arm end faces 48, 50, i.e., into the disk notches 56, 58, are located entirely within the disk notches 54, 56 in the radial direction inwardly from the sealing band 68. Similarly, the legs 82, 84 are preferably dimensioned to provide a predetermined or minimal extension in the radial direction outwardly from the outer side 92 of the sealing band 68. Specifically, the outer ends 182*a*, 184*a* of the legs 82, 84 have a radial extent that is contained entirely within the disk notches 54, 56. It may be noted that no portion of the sealing band assembly 46 extends outwardly from the radially outer surfaces 64, 66 of the disk arms 34, 36 or into the gap 69 outwardly from the sealing band 68, such that the structure of the sealing band assembly 46 is protected from potential damage that may be caused by any loose components or debris in the area outwardly from the disk arms 34, 36.

The radial extent of the legs 82, 84 is sufficient to provide a structure for cooperating with the circumferential sides 54*a*, 54*b* and 56*a*, 56*b* (FIG. 4) of the disk notches 54, 56 to limit circumferential movement of a corresponding segment of the sealing band 68 within the slots 52, 54. Additionally, the radial extent of the legs 82, 84 is sufficient to provide an adequate surface area for forming the weld joints 94, 96.

With respect to the configuration of the sealing band assembly 46 described herein, it may be noted that provision of the weld joints 94, 96 as the attachment structure between the clip member 78 and the sealing band 68 substantially ensures that no detachable components, such as fasteners, are available to detach and potentially become destructive debris within the engine. Further, in accordance with an aspect of the invention, the integrity of the connection between the clip member 78 and the sealing band 68 at the opposing weld joints 94, 96 is facilitated by providing a low mass clip member structure configured to reduce or minimize stress at the normally vulnerable weld connections through the provision of a low mass component that restrains movement in only the circumferential direction of the slots 52, 54. As will be explained further below, the clip member 78 has angled inner surfaces and/or notched relief areas, and the sealing band 68 has angled edge(s), to provide improved weld geometry between the clip member 78 and the sealing band 68 for receiving the welded joints.

Figure 5:
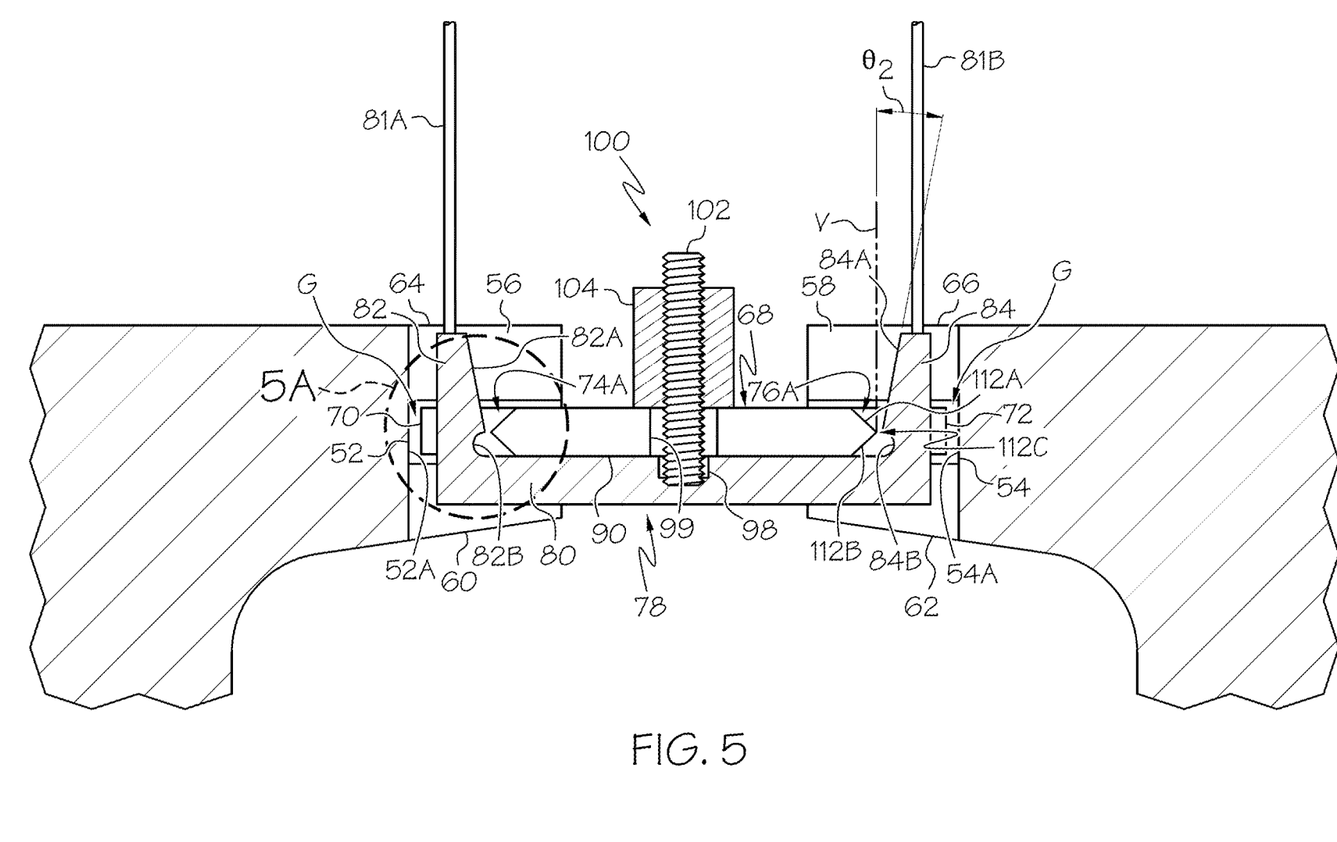
FIG. 5 is a cross-sectional view of the anti-rotation structure prior to being welded to the sealing band and a mounting structure.

Referring to FIGS. 5 and 6, an aspect comprising a mounting structure associated with the clip member 78 is illustrated. During assembly of the clip member 78 to the sealing band 68 it is necessary to retain the clip member 78 in position extending across the inner side 90 of the sealing band 68 prior to and during formation of the weld joints 94, 96. A temporary holding and positioning wire, comprising first and second end portions 81A and 81B, shown only in FIG. 5, and an intermediate loop portion (not shown) integral with the end portions 81A and 81B, is provided. The holding and positioning wire is welded at the first and second portions 81A and 81B to respective legs 82, 84 of the clip member 78, see FIG. 5. Prior to assembly of the clip member 78 to the sealing band 68, the clip member 78 is temporarily located within the cooling air cavity 38 with the holding and positioning wire attached thereto. During assembly, a technician uses the holding and positioning wire to position the clip member 78 in contact with the sealing band 68. This involves moving the clip member 78 radially such that the legs 82, 84 move into the band notches 74, 76 and the disk notches 54, 56 and the engagement surface 86 of the clip member center portion 80 contacts the sealing band 68. Once the clip member 78 has been positioned adjacent the sealing band 68, the mounting structure is used to temporarily retain the clip member 78 against the sealing band 68 to allow the weld joints 94, 96 to be formed.

When the clip member 78 is moved and positioned adjacent to the sealing band 68, the clip member 78 is preferably located such that the aperture 98 in the clip member 78 is generally aligned with the hole 99 in the sealing band 68. Hence, once the clip member 78 has been correctly positioned such that its legs 82, 84 are located within the disk and band notches 54, 56, 74, 76 and the engagement surface 86 of the clip member center portion 80 contacts the sealing band 68, the hole 99 of the sealing band 68 is generally aligned with the threaded aperture 98 in the clip member 78. As noted above, the threaded aperture 98 only extends part way through the clip member 78. Because the threaded bore 98 extends only part way through the clip member 78, flow of gases between the cooling air cavity 38 and the disk cavities 26, 28 through an opening in the clip member 78 and an adjacent portion of the sealing band 68 is prevented.

The mounting structure comprises a tool 100 configured for threaded engagement with the aperture 98, see FIGS. 5 and 6. The tool 100 includes a threaded shaft 102 and a nut member 104 in threaded engagement on the shaft 102.

As noted above, during assembly of the clip member 78 to the sealing band 68, the clip member 78 is pulled up radially into contact with the sealing band 68 such that the legs 82, 84 of clip member 78 are positioned in the disk and band notches 54, 56, 74, 76 and the engagement surface 86 of the clip member center portion 80 contacts the sealing band 68. It is noted that gaps G, see FIG. 5, between the band edges 70, 72 and inner surfaces 52A, 54A within the sealing band receiving slots 52, 54 must be large enough so that the first and second portions 81A and 81B of the holding and positioning wire fit within and can move through the gaps G. After the engagement surface 86 of the clip member center portion 80 contacts the sealing band 68, the shaft 102 is inserted through the hole 99 of the sealing band 68 and threaded into the aperture 98 of the clip member 78. The nut member 104 is then threaded down on the shaft 102 to bias the center portion 80 of clip member 78 firmly into engagement with the sealing band 68 to ensure that the clip member 78 is in substantially complete contact with the sealing band 68 and that there are no gaps formed during the welding process. Although the hole 99 may have an inner threading to engage the shaft 102, the hole 99 preferably lacks such an inner threading such that clip member 78 and sealing band 68 are held in contact with each other by threaded engagements between (i) the shaft 102 and the aperture 98 and (ii) the shaft 102 and the nut member 104, with the sealing band 68 sandwiched between the clip member 78 and the nut member 104.

After formation of the welds 94, 96, the nut member 104 may be unthreaded from the shaft 102 and removed, and the shaft 102 may be unthreaded from the aperture 98 and removed from the assembly formed by the sealing band 68 and clip member 78. The holding and positioning wire may also be detached from clip member 78 by breaking frangible connections between the wire end portions 81a, 81b and the outer ends 182a, 184a of the clip member legs 82, 84 and removed, the frangible connections being located at or near the points of attachment between weld wire and clip member 78.

Figure 4:
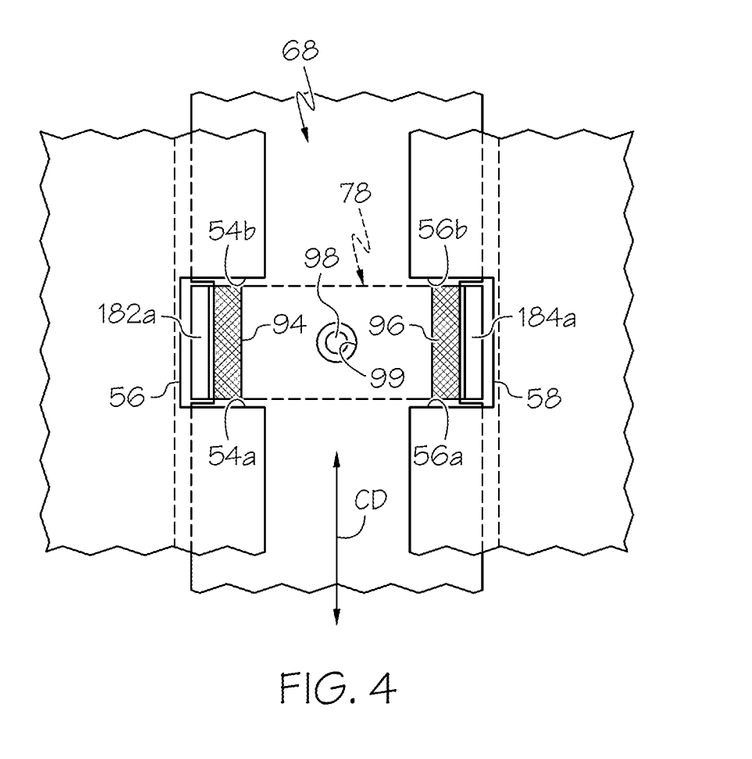
FIG. 4 is a plan view of the anti-rotation structure coupled to the sealing band in FIG. 3.

According to an aspect of the invention to improve the structural integrity of the welded joints 94, 96, the clip member 78 comprises first and second angled inner surfaces 82A, 84A on the first and second legs 82, 84 and notched relief areas 82B, 84B, and the sealing band 68 comprises first and second angled edges 74A and 76A on inner sides of the band notches 74, 76, see FIGS. 2, 5, 5A and 6, wherein the inner sides of the band notches extend generally parallel to the circumferential direction designated by arrow CD in FIG. 4. An angle $\Theta_1$, see FIG. 5A, between vertical V and the first inner surface 82A of the clip member first leg 82 may fall within a range of from about 10 to about 20 degrees. An angle $\Theta_2$, see FIG. 5, between vertical V and the second inner surface 84A of the clip member second leg 84 may fall within a range of from about 10 to about 20 degrees. The notched relief areas 82B, 84B are located between the angled inner surfaces 82A, 84A and the engagement surface 86 of the clip member center portion 80.

In the embodiment illustrated in FIGS. 1-5 and 5A, the first angled edge 74A on the sealing band 68 comprises first and third chamfers 110A and 110B, which converge to define a first V-edge 110C. The second angled edge 76A on the sealing band 68 comprises second and fourth chamfers 112A and 112B, which converge to define a second V-edge 112C. A first angle $\alpha_1$ defined between the first and third chamfers 110A and 110B, see FIG. 5A, may fall within a range of from about 85 to about 95 degrees. A second angle, not designated in the drawings, defined between the second and fourth chamfers 112A and 112B may fall within a range of from about 85 to about 95 degrees. The first and second V-edges 110C and 112C are radially positioned between the inner and outer sides 90 and 92 of the sealing band 68.

Figure 5A:
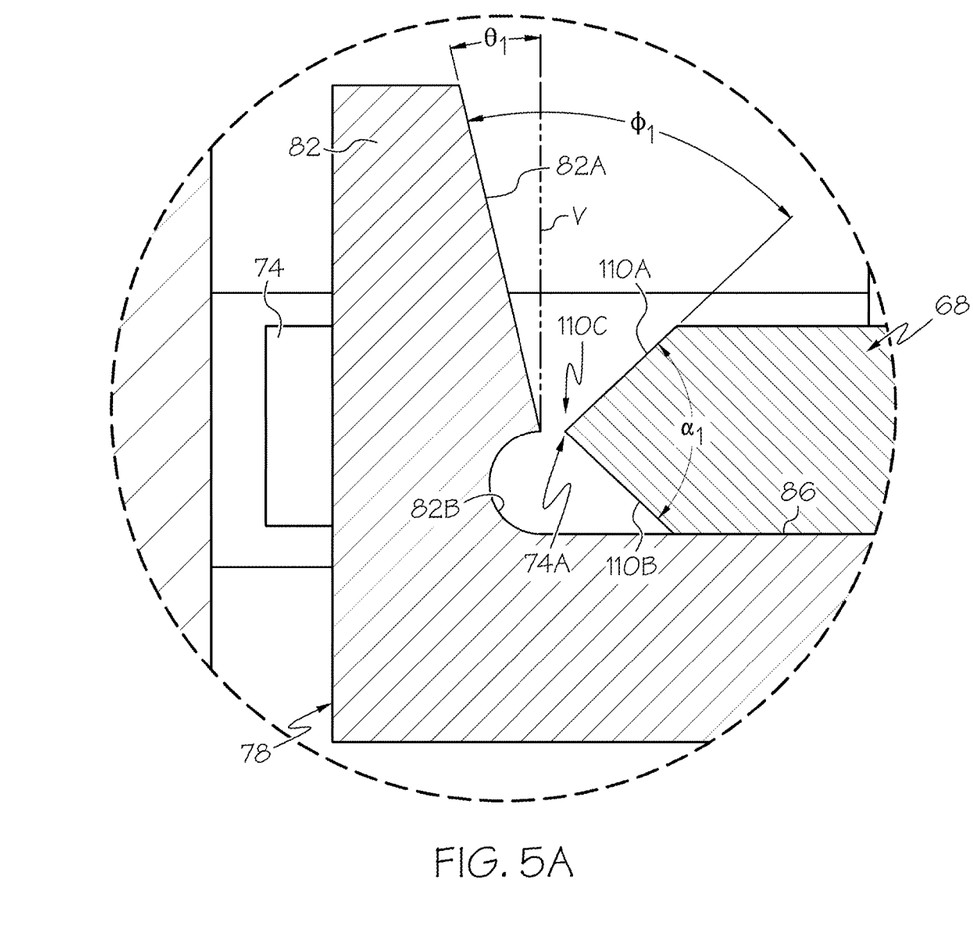
FIG. 5A is a close-up sectional view of the encircled area 5A shown in FIG. 5.

When the clip member 78 is being retained in position adjacent the sealing band 68 by the mounting structure and prior to the formation of the welded joints between the clip member legs 82, 84 and the sealing band 68, a first angle $\phi_1$, see FIG. 5A, is defined by the first chamfer 110A on the first angled edge 74A and the first angled inner surface 82A of the first leg 82 of the U-shaped clip member 78, and a second angle, not designated in the drawings, is defined by the second chamfer 112A on the second angled edge 76A and the second angled inner surface 84A of the second leg 84 of the U-shaped clip member 78. Each of the first and second angles $\phi_1$ is preferably greater than 50 degrees and may fall within a range of from about 50 to about 70 degrees.

After the clip member 78 has been clamped in position adjacent the sealing band 68 by the mounting structure, a welding operation is effected to create the weld joints 94, 96 between the legs 82, 84 and the sealing band 68. In a prior art arrangement, a clip member was provided comprising first and second legs having inner surfaces that were generally parallel to vertical and no relief areas were included. Further, the prior art sealing band had outer edges that were generally planar and parallel to vertical. The resultant square groove weld preparation without undercut relief areas is prone to incomplete weld penetration. That is, without arc access to the root of the weld preparation, a shallow weld with built in notch (remnant of the square groove weld preparation) results. The shallow weld is of inferior strength to a full penetration weld and the notch at its root represents a stress raiser that can initiate cracking. Shallow welds and notches are particularly disadvantageous when the service loadings, such as vibrations, are high. Relief areas and chamfering described in the present application provide access for the welder to direct arc energy to the full desired depth of weld and to achieve full penetration and full strength and to avoid the creation of stress raising notches. The undercut provided by the clip member relief areas and the sealing band underchamfering, i.e., the third and fourth chamfers 110B and 112B, also define desired full penetration areas at the V edges 110C and 112C. Furthermore, the relief areas in the clip member reduce its leg stiffness and provide accommodation for weld shrinkage by way of elastic deformation of the legs. Reduced residual weld stresses and reduced propensity for weld solidification cracking result from such shrinkage accommodation. This is of particular importance when the sealing band and U-shaped clip member are made from a nickel based alloy, such as alloy X or alloy 282. Full penetration, built in notch elimination and accommodation of weld shrinkage all act to reduce weld stresses and avoid weld cracking. So, it is believed that the weld joints 94, 96 in the present invention have fewer cracks and, hence, greater strength, than welds created between the prior art sealing band and clip member. It is also believed that the improved weld joints 94, 96 result because there is more room for the weld material to expand and contract during the welding operation, such that stresses and cracking in the weld material are reduced, wherein the additional room is provided due to the clip member 78 of the present invention having first and second legs with diverging angled inner surfaces 82A, 84A and notched relief areas 82B, 84B, and the sealing band 68 comprising first and second angled edges 74A and 76A.

It is further contemplated that if the sealing band has a width such that the gaps G between the band edges 70, 72 and the inner surfaces 52A, 54A within the sealing band receiving slots 52, 54 are smaller than the widths of the holding and positioning wire first and second portions 81A and 81B, then the holding and positioning wire cannot be used to pull the clip member 78 radially into contact with the sealing band 68. In such an embodiment, the U-shaped clip member 78 is first mounted to the sealing band 68 via the tool 100. At this juncture, the nut member 104 is not fully tightened down onto the sealing band 68 so as to allow the U-shaped clip member 78 to move relative to the sealing band 68. Thereafter, each sealing band segment with a clip member 78 and tool 100 attached thereto is inserted through the annular gap 69 between the end faces 48, 50 of the disk arms 34, 36 with the clip member 78 being moved through a corresponding pair of disk notches 56, 58. After the sealing band segment and clip member 78 have been inserted through the annular gap 69, the clip member 78 is moved using the tool 100 such that its legs 82, 84 move into the band notches 74, 76 and the disk notches 54, 56. The nut member 104 is then threaded down on the shaft 102 to bias the center portion 80 of clip member 78 firmly into engagement with the sealing band 68 to ensure that the clip member 78 is in substantially complete contact with the sealing band 68 and that there are no gaps formed during the welding process. Once the clip member 78 has been positioned adjacent the sealing band 68, the tool 100 temporarily retains the clip member 78 against the sealing band 68 to allow weld joints 94, 96 to be formed.

It is still further contemplated that a U-shaped clip member having first and second legs with diverging angled inner surfaces 82A, 84A may include a threaded cylinder extending from the engagement surface of the center portion in place of the threaded aperture 98. Such a threaded cylinder is disclosed in U.S. Ser. No. 13/789,802, filed on Mar. 8, 2013 and entitled "Gas Turbine Including Bellyband Seal Anti-Rotation Device," the entire disclosure of which is incorporated by reference herein. The cylinder may extend at least part way into a hole in the sealing band. During assembly of the U-shaped clip member to the sealing band 68, the shaft 102 of the tool 100 may be threaded into the threaded cylinder. The nut member 104 of the tool may then be threaded down on the shaft 102 to bias the center portion of the clip member firmly into engagement with the sealing band 68 to ensure that the clip member is in substantially complete contact with the sealing band 68 and that there are no gaps formed during the welding process. After formation of the welds 94, 96, the nut member 104 may be unthreaded from the shaft 102 and removed, and the shaft 102 may be unthreaded from the threaded cylinder and removed from the assembly formed by the sealing band 68 and clip member.

As seen in FIG. 6, the legs 82, 84 of the U-shaped clip member 78 have a thickness dimension that tapers toward the outer ends 182a, 184a due to the presence of the angled inner surfaces 82A, 84A. The clip member 78 may have legs 82, 84 with a widest thickness dimension, $T_L$, just above the notched relief areas 82B, 84B that is equal to or less than the axial depth of the notches 74, 76 in the sealing band 68, such that a length dimension, L, of the clip member 78 is no greater than, and may be less than, the axial width of the sealing band 68. Also, both the center portion 80 and the legs 82, 84 of the clip member 78 are formed with a width dimension, W, that is no greater than, and is preferably slightly less than, the circumferential width dimension of the disk notches 56, 58. Hence, the length (L) and width (W) dimensions of the clip member 78 ensure that the sealing band assembly 46 is dimensioned to provide clearance for radial and/or axial movement of the clip member 78 without binding within the disk notches 56, 58.

In accordance with a particular aspect of the invention, the mass of the clip member 78 is minimized by forming a thickness dimension, $T_B$, of the body portion 80 that is substantially thin. For example, the thickness, $T_B$, of the body portion 80 is preferably substantially equal to the widest thickness dimension, $T_L$, of the legs 82, 84. Further, the thickness, $T_B$, of the body portion 80 of clip member 78 may be close to, or slightly greater than, the thickness of the sealing band 68. Accordingly, the thickness of the body portion 80 is preferably sufficient to provide adequate rigidity to the clip member 78 extending across the width of the sealing band 68 between the legs 82, 84, while minimizing thickness to provide a low mass structure for coupling the legs 82, 84.

Figure 7:
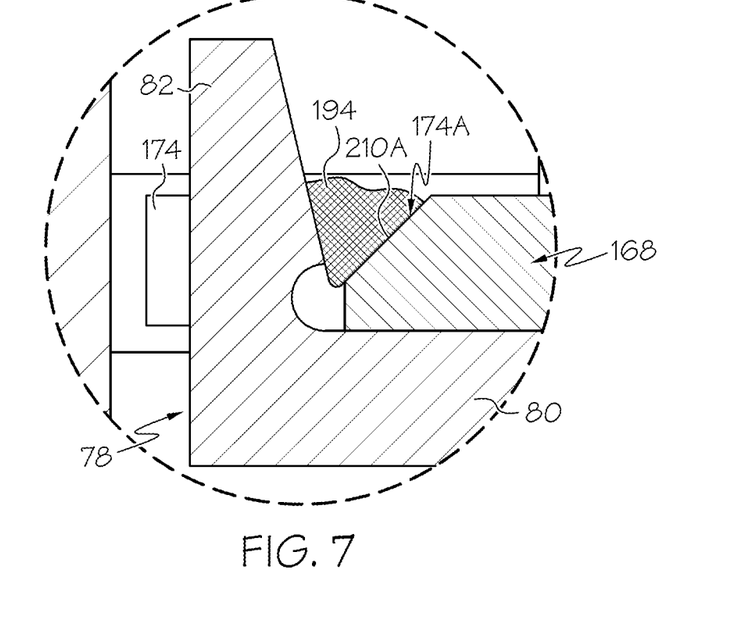
FIG. 7 is a close-up view of a portion of an anti-rotation structure having a clip member constructed in accordance with a second embodiment of the present invention.

According to an alternative embodiment of the present invention, a sealing band 168 may a first angled edge 174A and a second angled edge (not shown) on inner sides of first and second band notches, only the first band notch 174 is illustrated in FIG. 7. In this embodiment, the annular disk arms 34, 36, the U-shaped clip member 78, the slots 52, 54 and the disk engagement structure 56, 58 may be generally the same as in the embodiment of FIGS. 1-5, 5A and 6. In this embodiment, though, the first angled edge 174A comprises only a first chamfer 210A and does not comprise a third chamfer. Further, the second angled edge comprises only a second chamfer (not shown) and does not comprise a fourth chamfer. Hence, the sealing band 168 does not include third and fourth additional chamfers as provided in the embodiment of FIGS. 2-5, 5A and 6. The first and second chamfers may be formed and extend at generally the same angles as the first and second chamfers 110A and 112A of the embodiment illustrated in FIGS. 2-5, 5A and 6. The clip member 78 is held in position on the sealing band 168 by means of an attachment structure in the form of first and second weld joints, only the first weld joint 194 is illustrated in FIG. 7, between the legs 82, 84 and the sealing band 168.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine comprising:
   a plurality of stages, each stage comprising a rotatable disk and blades carried thereby, at least one pair of adjacent rotatable disks defining an annular gap therebetween and having respective opposing sealing band receiving slots aligned with the gap;
   a sealing band located in said opposing sealing band receiving slots to seal said annular gap;
   disk engagement structure defined in said pair of adjacent rotatable disks; and
   a clip member coupled to said sealing band and in engagement with said pair of adjacent rotatable disks through said disk engagement structure, said clip member having an aperture extending only part way through said clip member and used during assembly of said clip member to said sealing band, said clip member restricting movement of said sealing band.

2. The turbine of claim 1, further comprising:
   band engagement structure comprising a pair of circumferentially aligned band notches in opposing edges of said sealing band.

3. The turbine of claim 1, wherein said clip member comprises a U-shaped member having first and second legs and a center portion, said aperture being provided in said center portion.

4. The turbine of claim 3, further comprising:
   attachment structure affixing said legs of said U-shaped member to said sealing band.

5. The turbine of claim 4, wherein said attachment structure comprises welded joints between said U-shaped member legs and said band.

6. The turbine of claim 5, wherein said sealing band includes a hole located between axially spaced-apart first and second edges of said sealing band, said hole in said sealing band being generally aligned with said aperture in said clip member so as to allow a tool to pass through said sealing band hole and threadedly engage with said clip member aperture so as to retain said clip member in engagement with said sealing band during the formation of said welded joints between said U-shaped member legs and said sealing band.

7. The turbine of claim 5, wherein prior to the formation of the welded joints, a first edge of said sealing band comprises a first chamfer and a second edge of said sealing band comprises a second chamfer, a first angle greater than about 50 degrees is defined by said first chamfer and an angled first surface of said first leg of said U-shaped member and a second angle greater than about 50 degrees is defined by said second chamfer and an angled second surface of said second leg of said U-shaped member.

8. The turbine of claim 7, wherein prior to the formation of the welded joints, a first notched relief area is defined at an intersection of said first surface of said first leg of said U-shaped member and an engagement surface of said center portion of said U-shaped member and a second notched relief area is defined at an intersection of said second surface of said second leg of said U-shaped member and the engagement surface of said center portion of the U-shaped member.

9. The turbine of claim 7, further comprising band engagement structure comprising first and second circumferentially aligned band notches in opposing edges of said sealing band, said first chamfer being defined in said first notch and said second chamfer being defined in said second notch.

10. A turbine comprising:
    a plurality of stages, each stage comprising a rotatable disk and blades carried thereby, at least one pair of adjacent rotatable disks defining an annular gap therebetween and having respective opposing sealing band receiving slots aligned with the gap;
    a sealing band located in said opposing sealing band receiving slots to seal said annular gap, said sealing band comprising axially spaced-apart first and second edges;
    disk engagement structure defined in said pair of adjacent rotatable disks; a clip member coupled to said sealing band and in engagement with said pair of adjacent rotatable disks through said disk engagement structure, said clip member comprising a U-shaped member having first and second legs and a center portion, said clip member restricting movement of said sealing band; and
    welded joints affixing said legs of said U-shaped member to said sealing band,
    wherein prior to said welded joints being formed, said first edge of said sealing band comprises a first chamfer and a first angle greater than about 50 degrees is defined by said first chamfer and an angled first surface of said first leg of said U-shaped member.

11. The turbine of claim 10, wherein prior to said welded joints being formed, said second edge of said sealing band comprises a second chamfer and a second angle greater than about 50 degrees is defined by said second chamfer and an angled second surface of said second leg of said U-shaped member.

12. The turbine of claim 11, wherein said first edge of said sealing band further comprises a third chamfer and said second edge of said sealing band further comprises a fourth chamfer, said first and third chamfers defining a first V-edge and said second and fourth chamfers defining a second V-edge.

13. The turbine of claim 12, wherein each of said first and second V-edges define an angle falling within a range of from about 85 to about 95 degrees.

14. The turbine of claim 11, wherein prior to said welded joints being formed, a first notched relief area is defined at an intersection of said first surface of said first leg of said U-shaped member leg and an engagement surface of said center portion of the U-shaped member and a second notched relief area is defined at an intersection of said second surface of said second leg of said U-shaped member leg and a band adjacent surface of said center portion of the U-shaped member.

15. A process for coupling a clip member to a sealing band located in opposing sealing band receiving slots of a pair of adjacent rotatable disks of a turbine, the clip comprising a U-shaped member having first and second legs and a center portion provided with an aperture extending only part way through the clip member, the sealing band comprising a hole located between axially spaced-apart first and second edges of the sealing band, the process comprising:
  aligning the aperture in the U-shaped member center portion with the hole in the sealing band;
  passing a tool through the sealing band hole;
  threadedly engaging the tool with the U-shaped member aperture so as to retain said clip member in engagement with said sealing band; and
  forming welded joints between the U-shaped member legs and the band.

16. The process of claim 15, wherein prior to the formation of the welded joints, the first edge of the sealing band comprises a first chamfer and the second edge of the sealing band comprises a second chamfer, a first angle greater than about 50 degrees is defined by the first chamfer and an angled first surface of the first leg of the U-shaped member and a second angle greater than about 50 degrees is defined by the second chamfer and an angled second surface of the second leg of the U-shaped member.

17. The process of claim 16, wherein prior to the formation of the welded joints, a first notched relief area is defined at an intersection of the first surface of the first leg of said U-shaped member and an engagement surface of the center portion of the U-shaped member and a second notched relief area is defined at an intersection of the second surface of the second leg of said U-shaped member and the engagement surface of the center portion of the U-shaped member.

* * * * *